H. E. KNAPP.
Sled.

No. 65,756.

Patented June 11, 1867

Witnesses:

Inventor:
Herman E. Knapp

United States Patent Office.

HERMAN E. KNAPP, OF BENSON, VERMONT.

Letters Patent No. 65,756, dated June 11, 1867.

IMPROVEMENT IN SLED-BRAKE.

*The Schedule referred to in these Letters Patent and making part of the same.*

TO WHOM IT MAY CONCERN:

Be it known that I, HERMAN E. KNAPP, of the town of Benson, in the county of Rutland, and State of Vermont, have invented a new and improved Brake for Sleighs or Sleds; and I do hereby declare that the following is a full, clear, and exact description of the construction and operation of the same, reference being had to the accompanying drawings, making a part of this specification, and to the letters marked thereon, in which—

Figures 1, 2:
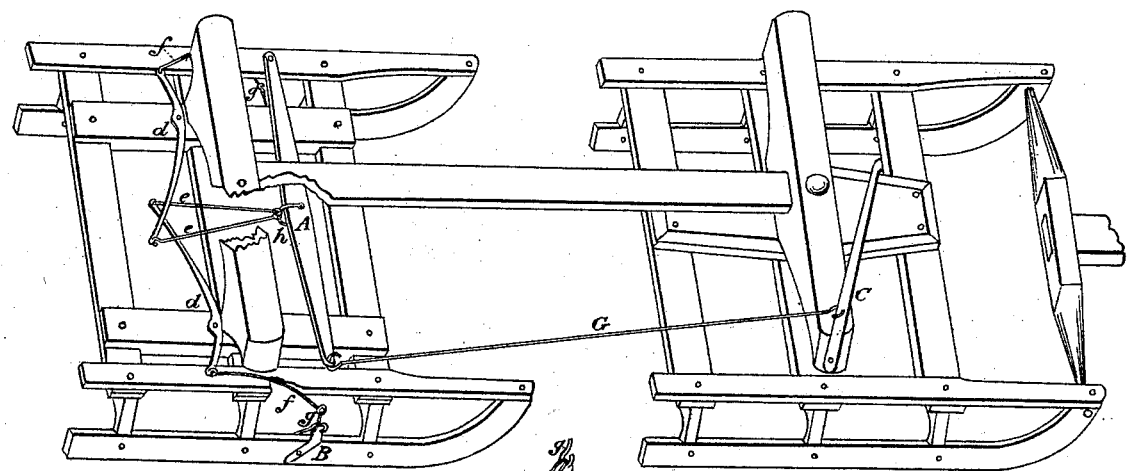
Figure 1 is a perspective view, showing the brake attached to the rear sleigh of a pair of traverse sleighs, with a section of the "bolster" or "rocker" and the right-hand "rave" of the sleigh broken away the better to show the position and operation of the appliances. A section of the reach, near where it is attached to the rocker, is also represented as broken away.
Figure 2 is an enlarged and separate perspective view of the double claw-arms B, the better showing their construction.

The nature of my invention consists as follows: A double claw-arm, B, is pivoted to the runners of the sleigh by passing a bolt through the runners at the point near where the greatest weight of the load would naturally fall. The double claw-arms B are constructed in two separate pieces, clasping the runner, or passing down astride it, and continuing up parallel to each other a suitable distance, to allow them to fall forward, and thus disengage the ground at the lower ends. At their upper ends they are bent inwardly to meet each other where the links $g\,g$ pass through them. To the links $g\,g$ are attached the rods $f\,f$, which pass upward and backward through the raves, and are linked to the outward extremities of the levers $d\,d$. The levers $d\,d$ are pivoted to the "saddles" of the sleigh. Linked to the inward extremities or long arms of the levers $d\,d$ are the rods $e\,e$, which pass forward under the rocker, and, approaching each other, are linked to the clevis $h$, which is attached to the centre of the cross-lever A. The cross-lever A is pivoted at one end to the rave, and at its other end is attached the rod G, which connects forward with the lever C, which is attached to the bolster of the forward sleigh. When the lever C is pushed forward the connecting mechanism will cause the claw-arms B to be pressed down forcibly upon the ground. It will be understood that the claw-arms B are attached to both runners.

To enable others to make use of my invention, I will proceed to describe its construction and operation.

I make the claw-arms B of iron or steel. The rods, links, and clevis are of iron, as are also the levers $d\,d$. In constructing the claw-arms B and the levers $d\,d$, I find it best to observe the rule of leverage or purchase of two to one, i. e., I place the pivot bolts at one-third the length of the levers $d\,d$ and the claw-arms B, measuring from the outward ends of the former, and from the bottom ends of the latter. I find the curved levers $d\,d$, as represented in the drawing, to work the best. The rod G may be varied in length, to correspond with any length of reach. It may be unhooked from the lever C and dropped to the ground, to be out of the way in loading and unloading. It will be seen that this brake is equally applicable to the ordinary sleigh or sled as to traverses.

What I claim as my invention, and desire to secure by Letters Patent, is—

The levers $d\,d$, in combination with the rods $f\,f\,e\,e$, lever A, rod G, and lever C, all acting in combination with the double claw-arms B, or their equivalent, the whole combined as specified and for the purpose set forth.

HERMAN E. KNAPP.

Witnesses:
C. REED,
A. C. WICKER.